(12) United States Patent
Giles et al.

(10) Patent No.: US 7,953,976 B2
(45) Date of Patent: May 31, 2011

(54) METHOD AND APPARATUS FOR PERVASIVE AUTHENTICATION DOMAINS

(75) Inventors: James R. Giles, Yorktown Heights, NY (US); Reiner Sailer, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 609 days.

(21) Appl. No.: 11/932,804

(22) Filed: Oct. 31, 2007

(65) Prior Publication Data

US 2008/0141356 A1    Jun. 12, 2008

Related U.S. Application Data

(63) Continuation of application No. 10/685,846, filed on Oct. 14, 2003, now Pat. No. 7,487,537.

(51) Int. Cl.
*H04W 12/06* (2009.01)
(52) U.S. Cl. ........ 713/168; 380/277; 713/150; 713/153; 726/2; 726/5; 726/9
(58) Field of Classification Search .................. 726/5–7, 726/10, 9; 713/168, 170, 182, 150, 153; 380/277
See application file for complete search history.

(56) References Cited

U.S. PATENT DOCUMENTS

| | | | |
|---|---|---|---|
| 6,223,291 B1 * | 4/2001 | Puhl et al. | 726/28 |
| 6,233,565 B1 * | 5/2001 | Lewis et al. | 705/35 |
| 6,253,326 B1 * | 6/2001 | Lincke et al. | 726/12 |
| 6,725,376 B1 | 4/2004 | Sasmazel et al. | |
| 6,967,941 B2 * | 11/2005 | Roy | 370/338 |
| 6,993,658 B1 * | 1/2006 | Engberg et al. | 713/185 |
| 7,047,560 B2 | 5/2006 | Fishman et al. | |
| 7,113,594 B2 * | 9/2006 | Boneh et al. | 380/28 |
| 7,213,047 B2 * | 5/2007 | Yeager et | 709/202 |
| 7,286,671 B2 * | 10/2007 | Yegin et al. | 380/270 |
| 7,346,025 B2 * | 3/2008 | Bryson | 370/328 |
| 2002/0152299 A1 * | 10/2002 | Traversat et al. | 709/223 |
| 2003/0005290 A1 * | 1/2003 | Fishman et al. | 713/156 |
| 2003/0056114 A1 | 3/2003 | Goland | |
| 2003/0084291 A1 * | 5/2003 | Yamamoto et al. | 713/168 |
| 2003/0145203 A1 * | 7/2003 | Audebert et al. | 713/169 |
| 2004/0025051 A1 * | 2/2004 | Adrangi et al. | 713/201 |
| 2004/0128546 A1 | 7/2004 | Blakley et al. | |
| 2004/0179511 A1 | 9/2004 | Kizu et al. | |
| 2004/0185777 A1 | 9/2004 | Bryson | |

* cited by examiner

*Primary Examiner* — Edan Orgad
*Assistant Examiner* — Yin-Chen Shaw
(74) *Attorney, Agent, or Firm* — Ference & Associates LLC

(57) ABSTRACT

Methods and apparatus for enabling a Pervasive Authentication Domain. A Pervasive Authentication Domain allows many registered Pervasive Devices to obtain authentication credentials from a single Personal Authentication Gateway and to use these credentials on behalf of users to enable additional capabilities for the devices. It provides an arrangement for a user to store credentials in one device (the Personal Authentication Gateway), and then make use of those credentials from many authorized Pervasive Devices without re-entering the credentials. It provides a convenient way for a user to share credentials among many devices, particularly when it is not convenient to enter credentials as in a smart wristwatch environment. It further provides an arrangement for disabling access to credentials to devices that appear to be far from the Personal Authentication Gateway as measured by metrics such as communications signal strengths.

18 Claims, 10 Drawing Sheets

METHOD AND APPARATUS FOR PERVASIVE AUTHENTICATION DOMAINS

CROSS-REFERENCE TO RELATED APPLICATIONS

This application is a continuation application of U.S. patent application Ser. No. 10/685,846 filed on Oct. 14, 2003 now U.S. Pat. No. 7,487,537, the contents of which are hereby incorporated by reference in its entirety.

FIELD OF THE INVENTION

The present invention relates generally to the field of pervasive computing and, more particularly, to authentication in wired and wireless networking configurations, where users have a collection of devices, with each device requiring authentication capabilities.

BACKGROUND OF THE INVENTION

It is becoming increasingly common for individuals to operate many devices that have the ability to connect to communication networks. In particular, it is common for individuals to carry many pervasive devices, or electronic devices such as personal digital assistants (PDAs), laptop computers, wireless telephones, sensors, digital watches, etc. that can all be used to communicate or access information over wireless or wireline communication networks. In many cases, communication with these pervasive devices needs to be done in a secure manner to ensure the confidentiality and integrity of data, as well as protecting the communication networks from unauthorized use.

This need for security places a great burden on users because they must provide authentication and authorization "credentials" for each device that they use for secure communications, where credentials are the means for declaring the security attributes of the users. The problem is compounded by the fact that many devices, such as digital watches, do not have convenient user interfaces for entering credentials.

There are systems, such as wireless phone networks, that address this problem by providing long-term storage of user credentials to access the phone network in the wireless phone, and by providing automatic authentication on behalf of the user to the phone network. This special case for existing wireless phone networks suffers from several disadvantages if applied to portable devices that connect with many different secure services. First, if a device is lost, the credentials stored on the device for each service can be compromised. In this case, the user must coordinate with each of the services to deactivate the credentials as opposed to coordinating with one service in existing wireless phone networks. Second, if devices need many different user credentials to access many different services, there is significant overhead (e.g., extensive time and effort to be expended) in entering these credentials for each device.

To simplify the task of authentication and authorization for users and to provide better protection for credentials, it has been recognized as being highly desirable if a user could enter credentials on one convenient authentication device such that the authentication device could automatically and securely share the user's credentials with several or all of his or her pervasive devices. Furthermore, it is desirable for such a system to protect user credentials that have been shared with pervasive devices in the event that the devices are lost or stolen.

There are existing solutions that offer some of these desirable qualities. For example, user credentials can be protected if a device is lost or stolen as long as the user credential has limited time validity, or is not cached by the device. However, this implies that the user would need to frequently provide credentials to the device.

Conceivably, there are many solutions for exchanging data from one device to another that could be used to share credentials between pervasive devices. Such solutions include TCP/IP over wireless or PDA infrared hot-syncing protocols, among others. These solutions, however, do not securely authenticate the devices. In PDA "hot-synching", for example, the only authentication used is the name of the device, which can easily be determined and forged.

There are also systems like Dynamic Host Configuration Protocol (DHCP) in which one device provides information that another device needs to gain access to a network. In DHCP, a DHCP server provides an Internet Protocol address, an address for a network gateway, and addresses for Domain Name Service machines to a DHCP client computer. The DHCP client computer uses these addresses to gain access to the network such that the needed information does not need to be manually configured on the DHCP client. However, the DHCP system does not address distribution of user credentials and cannot protect against disclosure of the information it provides to the client.

In view of the foregoing, a need has been recognized in connection with providing more efficient and effective solutions than those previously attempted.

SUMMARY OF THE INVENTION

The present invention, in accordance with at least one presently preferred embodiment, provides a mechanism by which security credentials (tokens) can be shared from a first device to one or more other authorized pervasive devices. There is provided an arrangement for a user to identify which devices are authorized to receive credentials from the first device and an arrangement for securely communicating the credentials. There is also provided an arrangement for protecting user credentials from disclosure or unauthorized use if a device is lost or stolen. Herein, a device that shares credentials is referred to as a "Personal Authentication Gateway", whereas the Personal Authentication Gateway and the pervasive devices authorized to retrieve credentials from it are referred to as making up a "Pervasive Authentication Domain."

One use for at least one embodiment of the invention relates to enabling a user to provide credentials to just one of his or her devices that will in turn provide credentials automatically to the user's other devices when the user needs to communicate securely with one of the other devices. This is expected to provide benefit for users who have many pervasive devices such as PDAs, wireless phones, laptop computers, etc.

Accordingly, one aspect of the present invention relates to providing a method for a Personal Authentication Gateway to distribute authentication and authorization credentials to other authorized devices when the devices need credentials for secure communication.

Another aspect of the present invention relates to providing an apparatus for distributing authentication and authorization credentials to other authorized devices when the devices need credentials for secure communication.

A further aspect of the present invention relates to reducing the burden on users that arises when they must manually provide credentials to each device that they use to communicate securely.

An additional aspect of the invention relates to helping protect credentials from disclosure or unauthorized use for devices that are lost or stolen, by ensuring that the credentials provided to the devices have limited time validity and by offering additional protections for the credentials.

By way of example, a user could provide authentication and authorization credentials to a Personal Authentication Gateway device. The personal authentication gateway device would then distribute credentials to authorized devices that would like to communicate securely on behalf of the user. The authentication credentials would be time limited and protected against tampering. If a device other than the Personal Authentication Gateway were lost or stolen, the Personal Authentication Gateway could be notified that the device is no longer authorized and the credentials on the misplaced device would be of limited value due to the time limited validity.

In summary, one aspect of the present invention provides a method of enabling at least one pervasive device to retrieve at least one authentication token from at least one personal authentication gateway, the at least one pervasive device comprising at least one automatic token client application and the at least one personal authentication gateway comprising at least one token server application, the method comprising the steps of: ascertaining at least one personal authentication gateway from the at least one pervasive device; sending at least one token request from at least one pervasive device to at least one personal authentication gateway; and receiving a token response at the pervasive device from the at least one personal authentication gateway.

Another aspect of the present invention provides a method of enabling at least one personal authentication gateway to distribute at least one authentication token to at least one authorized pervasive device, the at least one personal authentication gateway comprising at least one token server and the at least one pervasive device comprising at least one automatic token client, the method comprising the steps of: receiving at least one token request from at least one pervasive device on at least one personal authentication gateway; determining whether the pervasive device is authorized to receive authentication tokens; and sending at least one token response to the at least one pervasive device from at least one personal authentication gateway.

A further aspect of the present invention provides an apparatus for enabling at least one pervasive device to retrieve at least one authentication token from at least one personal authentication gateway, the apparatus comprising: a discoverer which finds at least one personal authentication gateway capable of responding to token requests; a token requestor which sends at least one requests for at least one token required by the at least one pervasive device; and a token responder which accepts at least one token requests and sends at least one token response with at least one authentication token to at least one authorized pervasive device.

An additional aspect of the present invention provides an apparatus comprising means for enabling at least one personal authentication gateway to distribute authentication tokens to at least one authorized pervasive device, the apparatus comprising: means for registering at least one pervasive device for membership in a pervasive authentication domain; and means for receiving a token request from at least one pervasive device; means for determining whether the at least one pervasive device is authorized to receive authentication tokens; and means for sending at least one token response to the at least one pervasive device from at least one personal authentication gateway.

An additional aspect of the present invention provides a program storage device readable by machine, tangibly embodying a program of instructions executable by the machine to perform method steps for enabling at least one pervasive device to retrieve at least one authentication token from at least one personal authentication gateway, the at least one pervasive device comprising at least one automatic token client application and the at least one personal authentication gateway comprising at least one token server application, the method comprising the steps of: ascertaining at least one personal authentication gateway from the at least one pervasive device; sending at least one token request from at least one pervasive device to at least one personal authentication gateway; receiving a token response at the pervasive device from the at least one personal authentication gateway.

A yet further aspect of the present invention provides a program storage device readable by machine, tangibly embodying a program of instructions executable by the machine to perform method steps enabling at least one personal authentication gateway to distribute authentication tokens to at least one authorized pervasive device, the at least one personal authentication gateway comprising at least one token server and the at least one pervasive device comprising at least one automatic token client, the method comprising the steps of: receiving at least one token request from at least one pervasive device on at least one personal authentication gateway; determining whether the pervasive device is authorized to receive authentication tokens; and sending at least one token response to the at least one pervasive device from at least one personal authentication gateway.

A yet additional aspect of the present invention provides an article of manufacture comprising a computer usable medium having computer readable program code means embodied therein for causing a computer to effect a method of enabling at least one pervasive device to retrieve at least one authentication token from at least one personal authentication gateway, the at least one pervasive device comprising at least one automatic token client application and the at least one personal authentication gateway comprising at least one token server application, the method comprising the steps of: ascertaining at least one personal authentication gateway from the at least one pervasive device; sending at least one token request from at least one pervasive device to at least one personal authentication gateway; and receiving a token response at the pervasive device from the at least one personal authentication gateway.

Yet another aspect of the present invention provides an article of manufacture comprising a computer usable medium having computer readable program code means embodied therein for causing a computer to effect a method of enabling at least one personal authentication gateway to distribute at least one authentication token to at least one authorized pervasive device, the at least one personal authentication gateway comprising at least one token server and the at least one pervasive device comprising at least one automatic token client, the method comprising the steps of: receiving at least one token request from at least one pervasive device on at least one personal authentication gateway; determining whether the pervasive device is authorized to receive authentication tokens; and sending at least one token response to the at least one pervasive device from at least one personal authentication gateway.

Furthermore, an additional aspect of the present invention provides a computer program product comprising a computer usable medium having computer readable program code means embodied therein for causing enablement of at least one pervasive device to obtain authentication tokens from at least one personal authentication gateway, the computer readable program code means in the computer program product comprising computer readable program code means for causing a computer to effect an apparatus for enabling at least one pervasive device to retrieve at least one authentication token from at least one personal authentication gateway, the apparatus comprising: a discoverer which finds at least one personal authentication gateway capable of responding to token requests; a token requestor which sends at least one requests for at least one token required by the at least one pervasive device; and a token responder which accepts at least one token requests and sends at least one token response with at least one authentication token to at least one authorized pervasive device.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Figure 1:
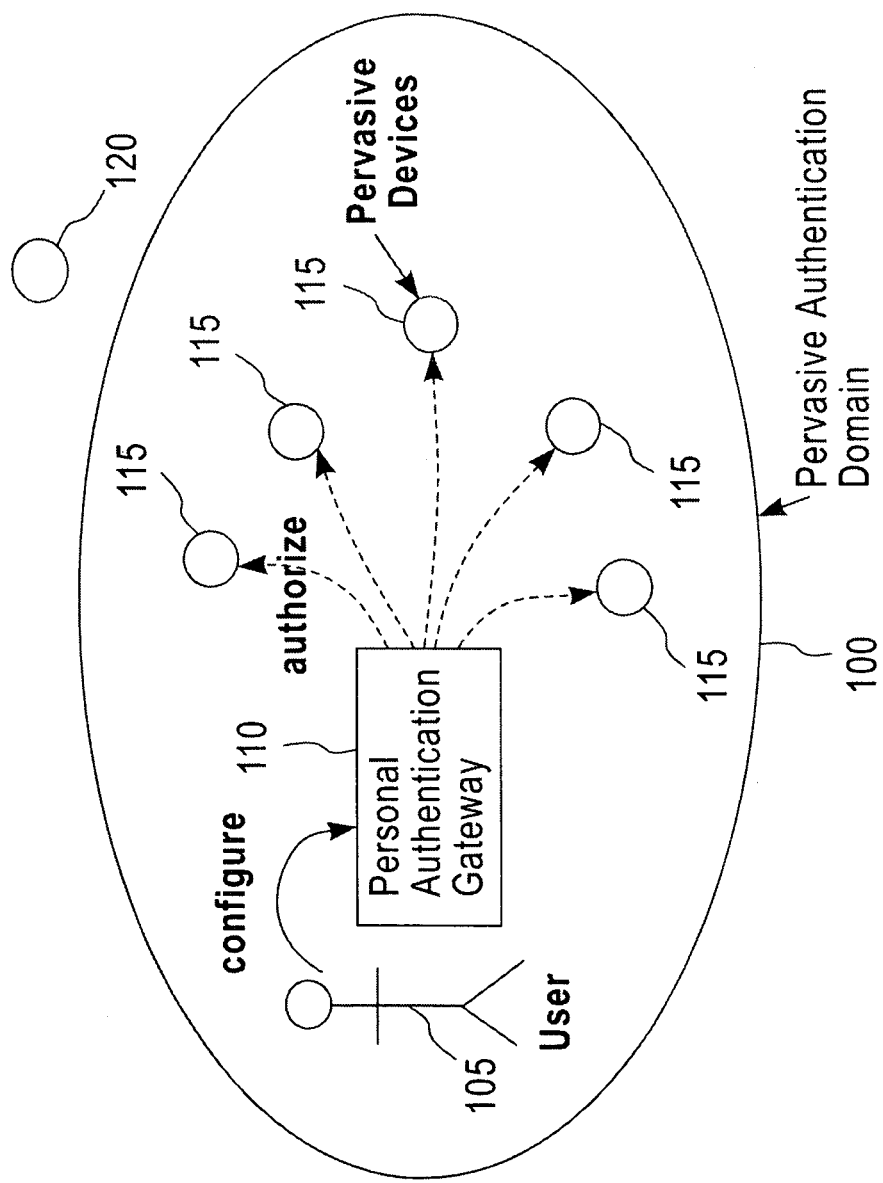
FIG. 1 shows an example of a Pervasive Authentication Domain that includes several Pervasive Devices and a Personal Authentication Gateway.

In accordance with at least one presently preferred embodiment, pervasive user devices are enabled to retrieve authentication tokens automatically from an authentication gateway. A typical environment in which multiple Pervasive Devices share their user's access credentials is illustrated in FIG. 1. The figure shows a user 105, his or her Personal Authentication Gateway 110, a Pervasive Authentication Domain 100, and Pervasive Devices inside (115) and outside (120) of the Pervasive Authentication Domain.

The user 105 configures the Personal Authentication Gateway 110 to support multiple Pervasive Devices 115 within a Pervasive Authentication Domain 100. The Personal Authentication Gateway 110 communicates with the Pervasive Devices 115 and 120 by wired or wireless means. The Personal Authentication Gateway allows Pervasive Devices inside the Pervasive Authentication Domain to obtain credentials that allow those Pervasive Devices 115 to authenticate to services on behalf of the user as configured in the Personal Authentication Gateway. There is at least one Personal Authentication Gateway 110 running within a Pervasive Authentication Domain. The same Personal Authentication Gateway can serve multiple Pervasive Authentication Domains.

It is well known that client applications running on Pervasive Devices need to be configured with access credentials or the user of those client application must provide credentials if a client application needs to access an access-controlled server application. Many existing and conceivable Pervasive Devices, however, do not offer user interfaces that are convenient for entering credentials (for example, a network-connected watch) and many users do not want to re-enter user credentials into many Pervasive Devices. Users thus face the burden of maintaining user credentials for each such client application and pervasive domain. For client applications that use pre-configured credentials, administrators or users must make changes to the applications if the credentials change. Users must also maintain their credentials for each server application and enter them each time client applications need access to access-controlled server applications. To reduce the burden on users, it has been recognized that a mechanism is needed that enables client applications on all of a user's Pervasive Devices to obtain user credentials for access-controlled server applications and represent their user. Such a mechanism should allow only those Pervasive Devices access to user credentials that are within the Pervasive Authentication Domain of the user and are configured in the Personal Authentication Gateway.

Figure 2:
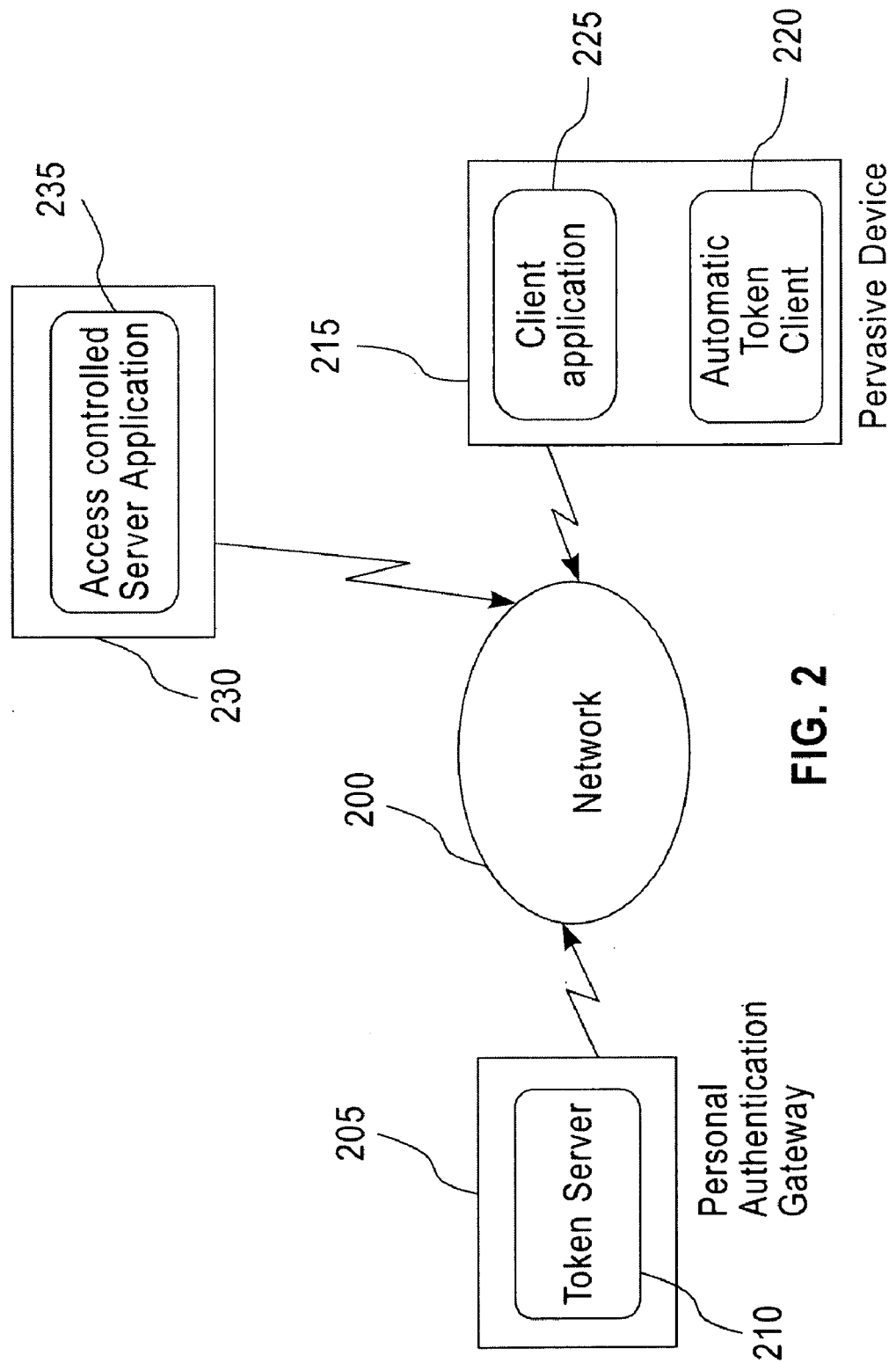
FIG. 2 illustrates the deployment of a method for enabling a user to communicate securely using any Pervasive Device within a Pervasive Authentication Domain while providing authentication and access control credentials only to a Personal Authentication Gateway, in the context of the environment set forth in FIG. 1.

In accordance with at least one presently preferred embodiment of the present invention, a Pervasive Device inside the Pervasive Authentication Domain of a user is enabled to automatically retrieve current user credentials and provide them to its client applications, thus allowing them to adequately represent the user. FIG. 2 shows the processes involved in a mechanism that can deploy such a method. At least one network 200, offering wired or wireless communication, connects at least one Personal Authentication Gateway 205, at least one Pervasive Device 215, and optionally one or more servers 230. Any Personal Authentication Gateway 205 will preferably include at least one Token Server 210, while any Pervasive Device 215 will preferably include at least one Automatic Token Client 220. In at least one embodiment of the present invention, the Personal Authentication Gateway 205 can be integrated into a Pervasive Device 215, in which case the combined Pervasive Device includes at least one Token Server 210. Servers 230 include at least one access-controlled Service Application 235 that requires clients to provide user credentials before allowing access to the service.

The Automatic Token Client 220 on a Pervasive Device 215 automatically requests actual user credentials from the Token Server 210 on the Personal Authentication Gateway 205. The Token Server 210 decides, based upon its configuration and the Pervasive Authentication Domain boundaries, whether and with which user credentials to respond to Token Requests from Automatic Token Clients 220. The Automatic Token Client 220 on a Pervasive Device 215 may translate credentials provided by the Token Server 210 into credentials understood by Client Applications 225 running on this Pervasive Client. When the user logs into the Personal Authentication Gateway 205, the Token Server 210 authenticates the user and allows authorized Pervasive Devices to retrieve user credentials. Retrieved user credentials are presented to one or more Server Applications 235 by the Pervasive Device 215 for authentication.

Figure 3:
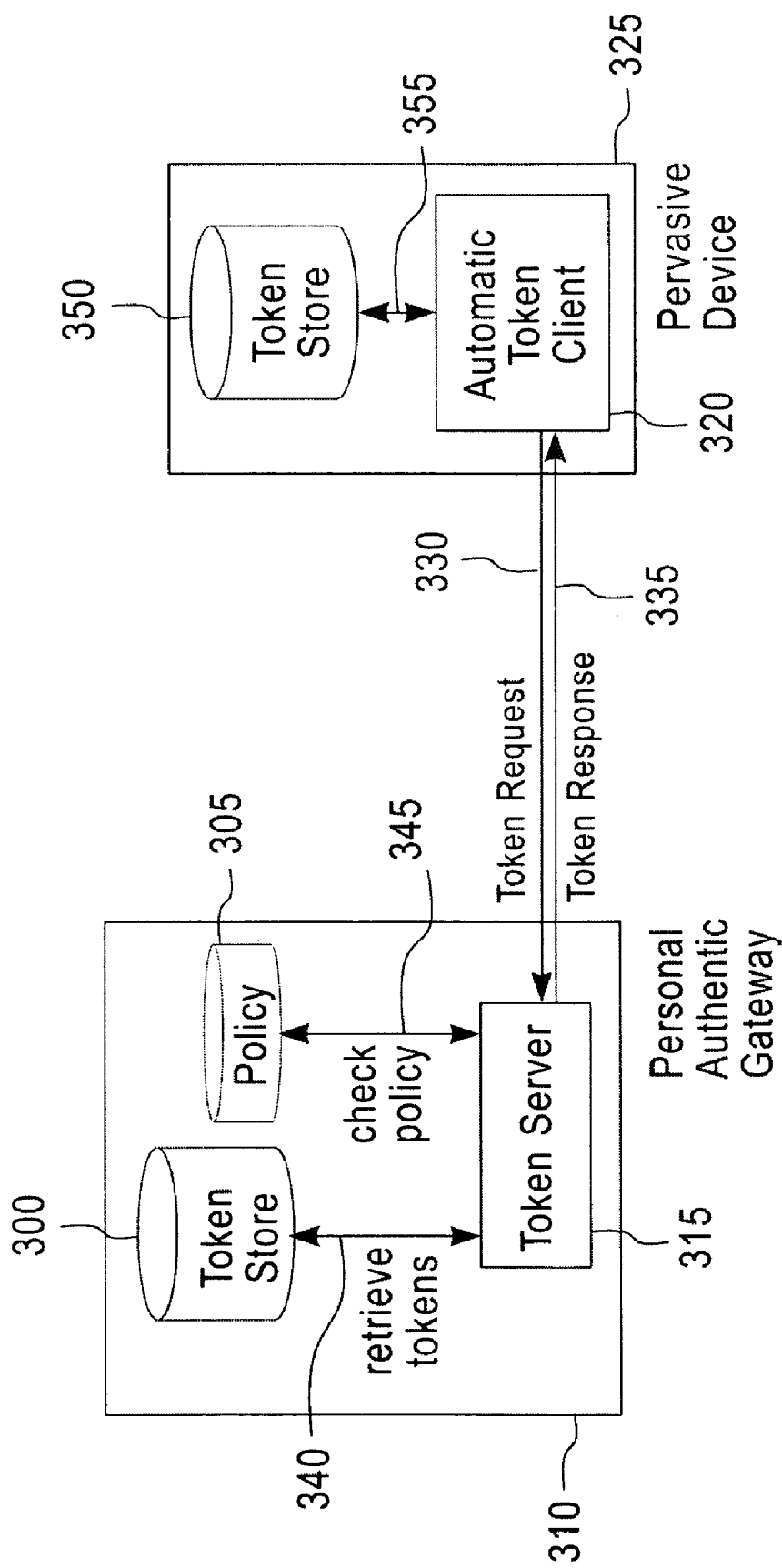
FIG. 3 illustrates a technique for a Pervasive Device Automatic Token Client to obtain a token from a Token Server running on a Personal Authentication Gateway.

In accordance with an embodiment of the present invention, FIG. 3 shows a technique for enabling an Automatic Token Client 320 on a Pervasive Device 325 inside the Pervasive Authentication Domain to retrieve actual user credentials from the Token Server 315 on the Personal Authentication Gateway 310. In this embodiment, the Token Server 315 is running on the Personal Authentication Gateway device 310 and the Automatic Token Client 320 is running on a Pervasive Device 325. Additionally, the Personal Authentication Gateway can include a Policy Client 305, which determines if an Automatic Token Client is authorized to retrieve actual user credentials, and a Token Store 300, which stores user credential tokens.

An Automatic Token Client 320 sends a Token Request 330 including a unique identification (Slave_ID) of the client to the Token Server 315 to retrieve actual user tokens for client applications running on the Pervasive Device 325. The Token Server 315 first checks the policy (step 345) to determine, based on the Slave_ID, if this Automatic Token Client is authorized to receive user credentials. Then, the set of user credentials for this Automatic Token Client are determined, retrieved (step 340) from the Token Store 300, and then sent with a Token Response Message 335 to the Automatic Token Client. In a preferred embodiment, the credentials are designed to expire after a short period of time on the order of about 10 minutes.

The Automatic Token Client 320 stores retrieved tokens 355 in a local Token Store 350 on the Pervasive Device 325. Client applications on the Pervasive Device 325 are supplied with user credentials from the Token Store 350, which allows client applications to initiate and respond to services on behalf of the user.

Figure 4:
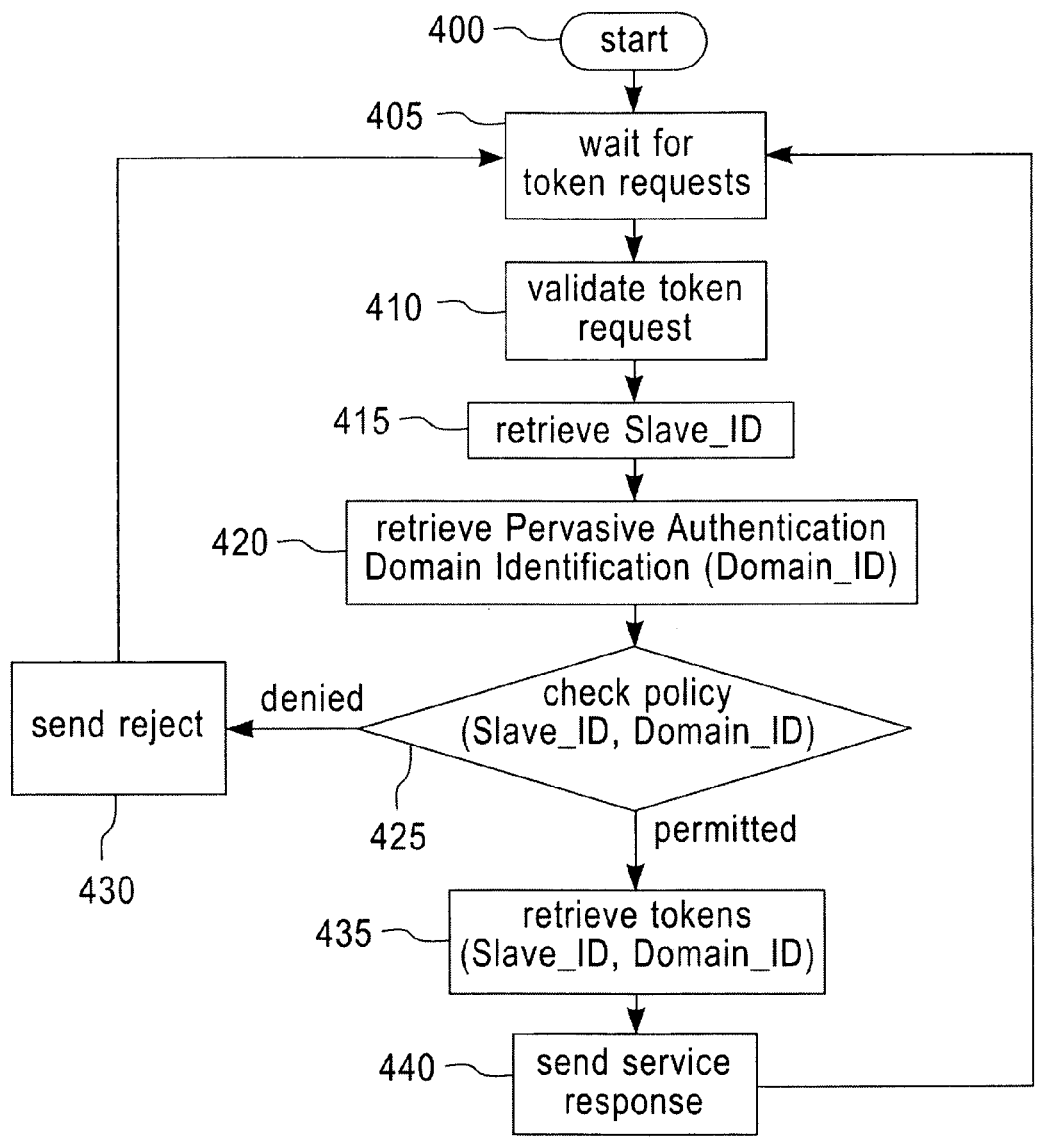
FIG. 4 schematically illustrates actions taken by the Token Server for the technique shown in FIG. 3.
Figure 7:
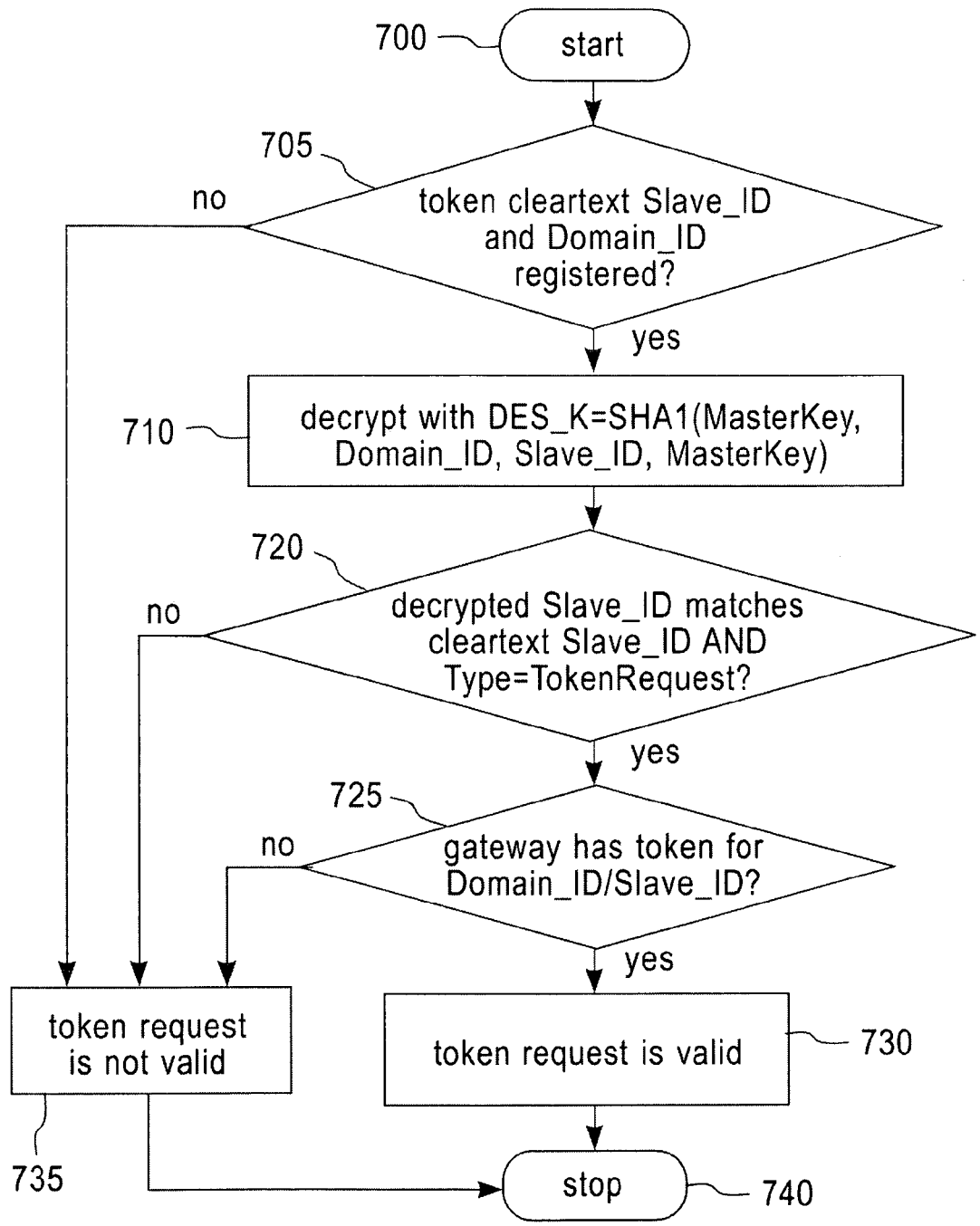
FIG. 7 schematically illustrates actions taken to validate a Token Request at the Personal Authentication Gateway for the technique shown in FIG. 3.

FIG. 4 shows a flowchart that illustrates the actions taken by the Token Server 315 for the embodiment shown in FIG. 3. The flowchart is entered in step 400 whenever the device implementing the FIG. 3 embodiment is started at the Personal Authentication Gateway 310. In step 405, the Token Server waits for Token Requests from an Automatic Token Client 320. Upon receiving a Token Request, the Token Server validates 410 the Token Request. (In a preferred embodiment, the validation of the Token Request may be carried out as illustrated in FIG. 7.) In step 415, the Token Server retrieves the Slave_ID of the Pervasive Device which is included in the Token Request in a preferred embodiment. In step 420, the Token Server retrieves the identification of the Pervasive Authentication Domain Domain_ID from the Token Request.

In step 425, the Token Server determines if the Slave_ID and Pervasive Authentication Domain identification (Domain_ID) obtained from the Token Request are permitted to receive tokens. In a preferred embodiment, the Token Server permits the request if the Pervasive Authentication Domain identification (Domain_ID) in the Token Request matches a Pervasive Authentication Domain identification of the Token Server, if the Slave_ID obtained from the Token Request has been registered (see FIG. 10) with the Personal Authentication Gateway for the given Domain_ID, and if the Pervasive Device is deemed to be secure by the Personal Authentication Gateway. In a preferred embodiment, the Pervasive Device is deemed to be secure if the user has not indicated otherwise to the Personal Authentication Gateway, the Pervasive Device has not indicated otherwise to the Personal Authentication Gateway, and the Pervasive Device is determined to be within a predetermined distance of the Personal Authentication Gateway as measured by signal strength in the case of wireless communication.

If the given Slave_ID and Domain_ID are permitted in step 425, one or more authentication tokens associated with the Slave_ID and Domain_ID are retrieved in step 435. In a preferred embodiment, the tokens are designed to be valid for a short period of time, on the order of 10 minutes. The tokens are securely transmitted to the Automatic Token Client in step 440, and then step 405 is executed. If the given Slave_ID and Domain_ID are not permitted in step 425, then the Token Request is denied and step 430 is executed. In step 430, the Token Server sends a rejection message to the Automatic Token Client and step 405 is executed.

Figure 5:
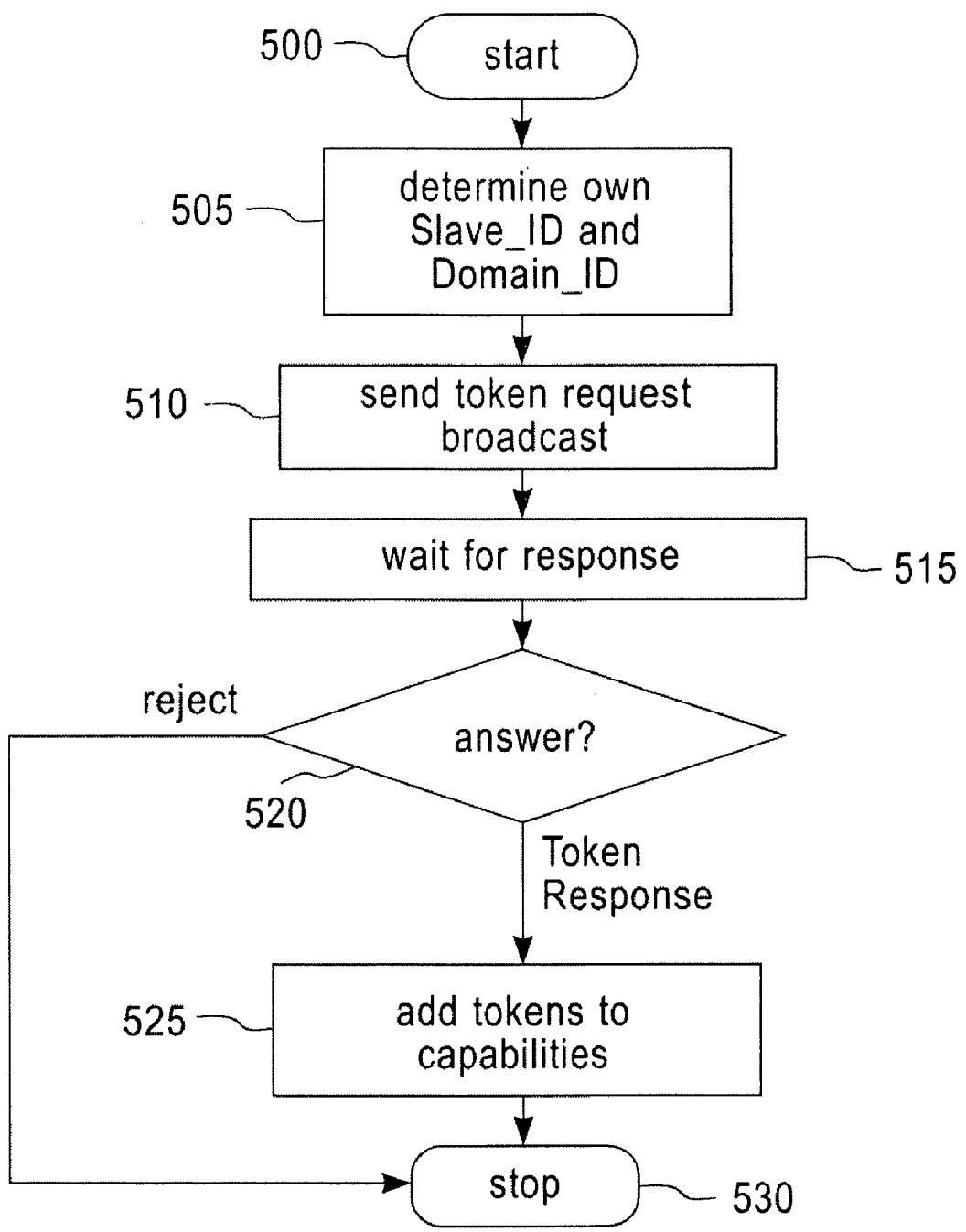
FIG. 5 schematically illustrates actions taken by the Automatic Token Client for the technique shown in FIG. 3.

FIG. 5 shows a flowchart that illustrates the actions taken by the Automatic Token Client 320 for the embodiment shown in FIG. 3. The flowchart is entered in step 500 whenever a Pervasive Device needs authentication credentials that are not currently stored in the Pervasive Device 325. In a preferred embodiment, the Pervasive Device enters step 500 during its configuration and setup phase. In step 505, the Automatic Token Client determines its Slave_ID and the Domain_ID of the Pervasive Authentication Domain. In a preferred embodiment, the Slave_ID and at least one Domain_ID are assigned to the Automatic Token Client in the registration phase (see FIG. 10) and are stored persistently in the Pervasive Device 325. Next, step 510 is executed and the Automatic Token Client sends a Token Request broadcast (the Token Request structure is further detailed in FIG. 6). In step 515, the Automatic Token Client waits a predetermined time for a response from a Token Server 315. In step 520, if the result is a Token Response, step 525 is executed and the tokens included in the response are validated and added to the Token Store 350 extending the access-control capabilities of the Pervasive Device 325. In step 530, the Automatic Token Client process stops. In step 520, if the answer is a rejection of the Token Request or no answer is provided in the specified time, step 530 is executed.

Figure 6:
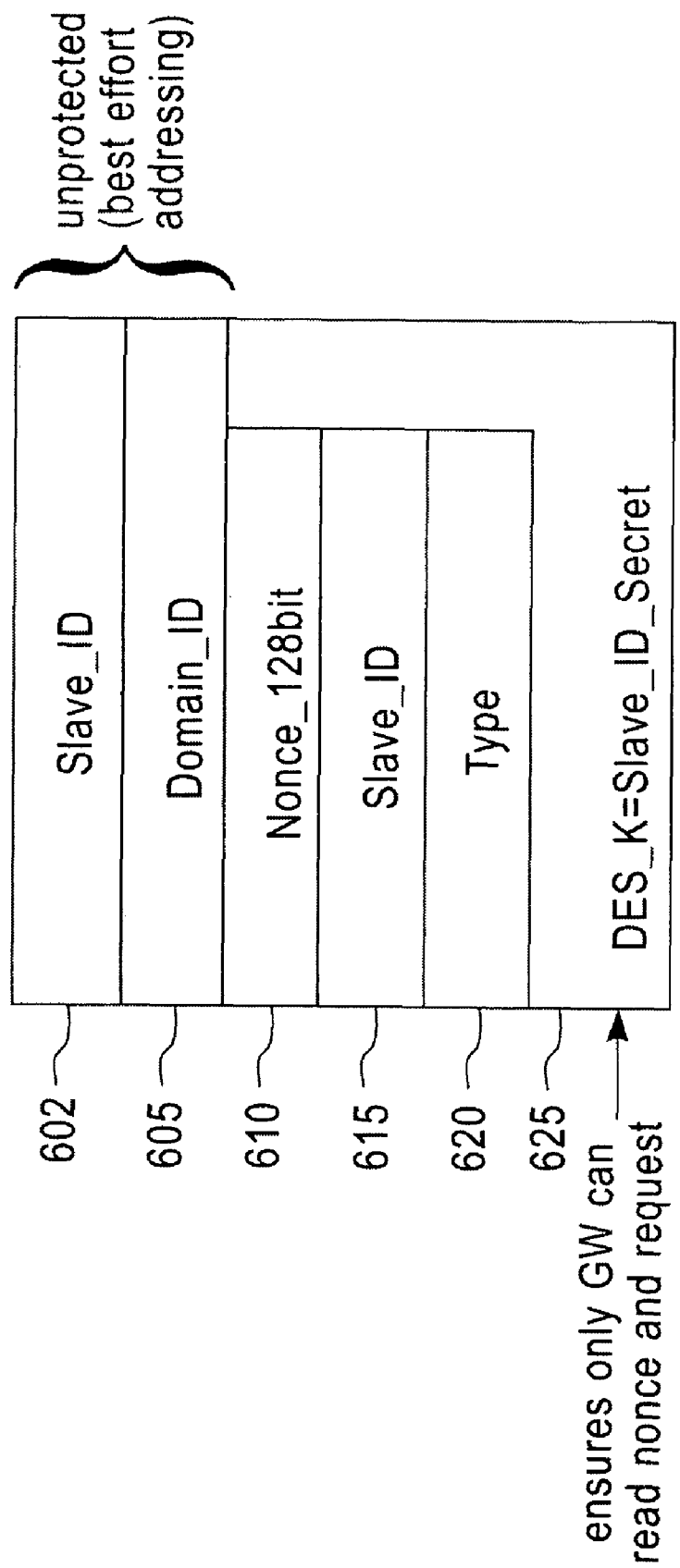
FIG. 6 illustrates an embodiment of a Token Request message.

FIG. 6 illustrates a Token Request 330 structure sent by the Automatic Token Client 320 for the preferred embodiment illustrated in FIG. 3. The Slave_ID field 602 and the Domain_ID 605 are identifications for the Pervasive Device and the Pervasive Authentication Domain that in a preferred embodiment are given to an Automatic Token Client on the Pervasive Device when it registers with a Personal Authentication Gateway (in other embodiments, the Slave_ID may be generated randomly or based on characteristics of the Pervasive Device's hardware or software and the Domain_ID might be a default value). The Slave_ID provides additional logical addressing for several Automatic Token Clients sharing the same physical addressing. The Domain_ID distinguishes different domains, such as a home domain or an office domain. The Nonce_128 bit field 610 is a random value generated by the Pervasive Device that protects against Token Request replay attacks. The Nonce_128 bit field 610, the Slave_ID field 615, and Type field 620 are encrypted 625 using symmetric cryptographic encryption algorithm (e.g., Triple-DES).

The DES encryption key, which is called herein the Slave_ID_Secret, is computed initially by the Personal Authentication Gateway from a secure hash (e.g., SHA1) of the Slave_ID, Domain_ID and a master key only known to the Gateway. The DES encryption key, Slave_ID_Secret, is securely provided to the Pervasive Device by the Personal Authentication Gateway when the Pervasive Device registers with the gateway (see FIG. 10 for more details). The DES encryption allows the Personal Authentication Gateway to be sure that the Token Request is from the Pervasive Device to which the Slave_ID_Secret is known.

The Nonce__128 bit field is decrypted by the Token Server and re-encrypted in the Token Response structure so that the Automatic Token Client can verify that the Token Response is valid. Because the Nonce__128 bit field is encrypted by secrets known only to the Pervasive Device and the Personal Authentication Gateway, if the Pervasive Device receives a Token Response with the Nonce__128 bit field 810 repeating the Nonce__128 bit field 610 of a Token Request, then the Token Response is a response to the Token Request from a valid Personal Authentication Gateway. The Slave_ID field 615 is a protected copy of the Slave_ID field 602. The Type field 620 is used to indicate the type of the message (here: Token Request). The encryption 625 ensures that only the Personal Authentication Gateway can read the Nonce__128 bit field and the Type field, and provides an integrity-protected copy of the Slave_ID 615.

FIG. 7 shows a flowchart that illustrates the actions taken to validate a Token Request (see FIG. 6) at the Personal Authentication Gateway for the embodiment shown in FIG. 3. The flowchart is entered in step 700 whenever a Token Request 330 arrives at a Token Server 315. In step 705, the Token Server checks to see if its policy allows distribution of tokens to an Automatic Token Client for Slave_ID 602 and Domain_ID 605. If tokens are allowed in step 705, then in step 710 the Token Server 330 decrypts the DES-encrypted 625 portion of the Token Request using the Slave_ID_Secret DES key and then step 710 is executed (see Slave_ID_Secret computation in FIG. 10). If tokens are not allowed for the Slave_ID/Domain_ID in step 705, then in step 735, the Token Request is not valid and execution stops in step 740. After decryption in step 710, the Nonce__128 bit field 610, Slave_ID field 615, and Type field 620 are revealed. In step 720, the Token Server checks to see if the Slave_ID field 615 decrypted in step 710 matches the clear text Slave_ID field 602. If the Slave_ID fields match if step 720, in step 725 the gateway checks to see if it has tokens of type specified by the Type field 620 for the Automatic Token Client with the Slave_ID 605. If the Slave_ID fields do not match or the Type field denotes not a Token Request in step 720, then step 735 is executed. If the Token Server has tokens for Slave_ID and Domain_ID in step 725, then in step 730 the Token Request valid message is returned and execution stops at step 740. The Token Server does not have matching tokens in step 725, then step 735 is executed.

Figure 8:
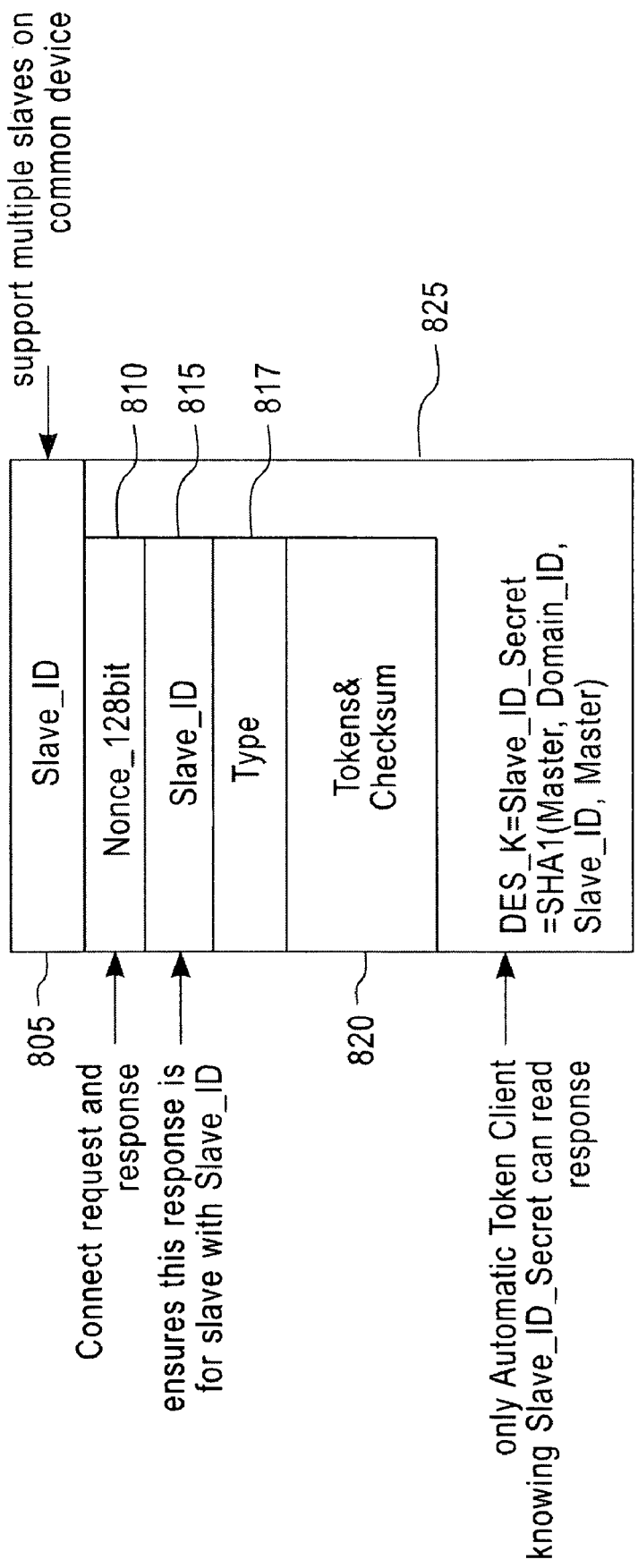
FIG. 8 illustrates another embodiment of the Token Response message.
Figure 10:
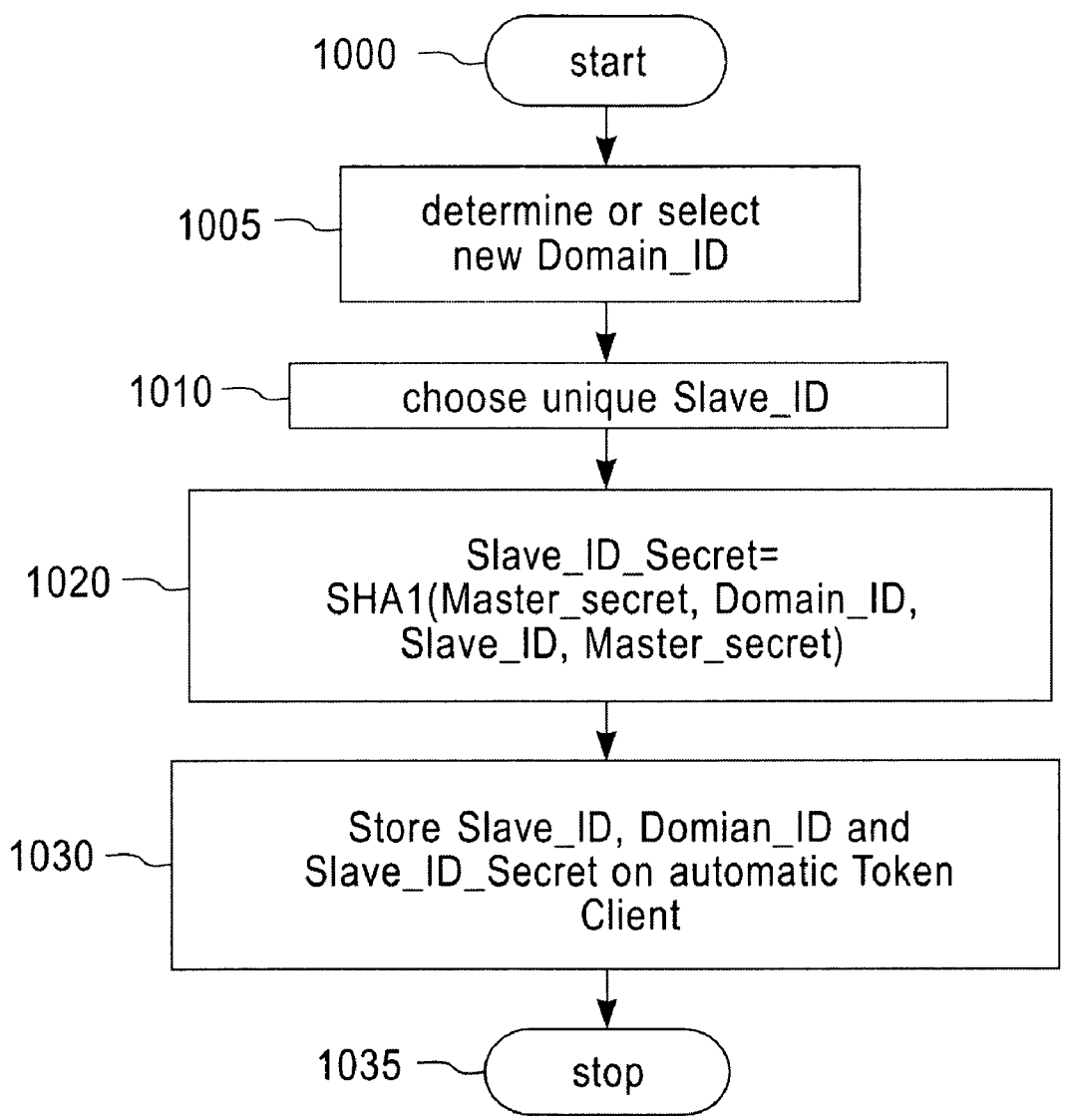
FIG. 10 schematically illustrates actions taken to register a Pervasive Client (slave) for membership within a Pervasive Authentication Domain.

FIG. 8 shows an embodiment of the Token Response 335 message. The Slave_ID fields 805 and 815 identify the Automatic Token Client 320 that should receive the Token Response, and they are the same as the Slave_ID fields 602 and 615 in the corresponding Token Request 330. The Type field 817 contains the message type (here: Token Response) and the Tokens and Checksum field 820 contains the authentication tokens and checksums for integrity. The Nonce__128 bit field 810, the Slave_ID field 815, the Type 817 (here: Token Response), and the Tokens and Checksum field 820 are encrypted 825 by the Token Server with triple-DES encryption to ensure that only the Automatic Token Client can read the Token Response. The DES encryption key, Slave_ID_Secret, is computed by the Personal Authentication Gateway as shown in FIG. 10. The Slave_ID_Secret is securely provided to the Automatic Token Client when the Pervasive Device registers with the Pervasive Authentication Domain (see FIG. 10). The DES encryption allows the Pervasive Authentication Gateway to ensure that the Slave_ID fields 615 and 602 match Slave_ID of the Pervasive Device that can decrypt the tokens and protects the Tokens and Checksum from disclosure against other devices.

Figure 9:
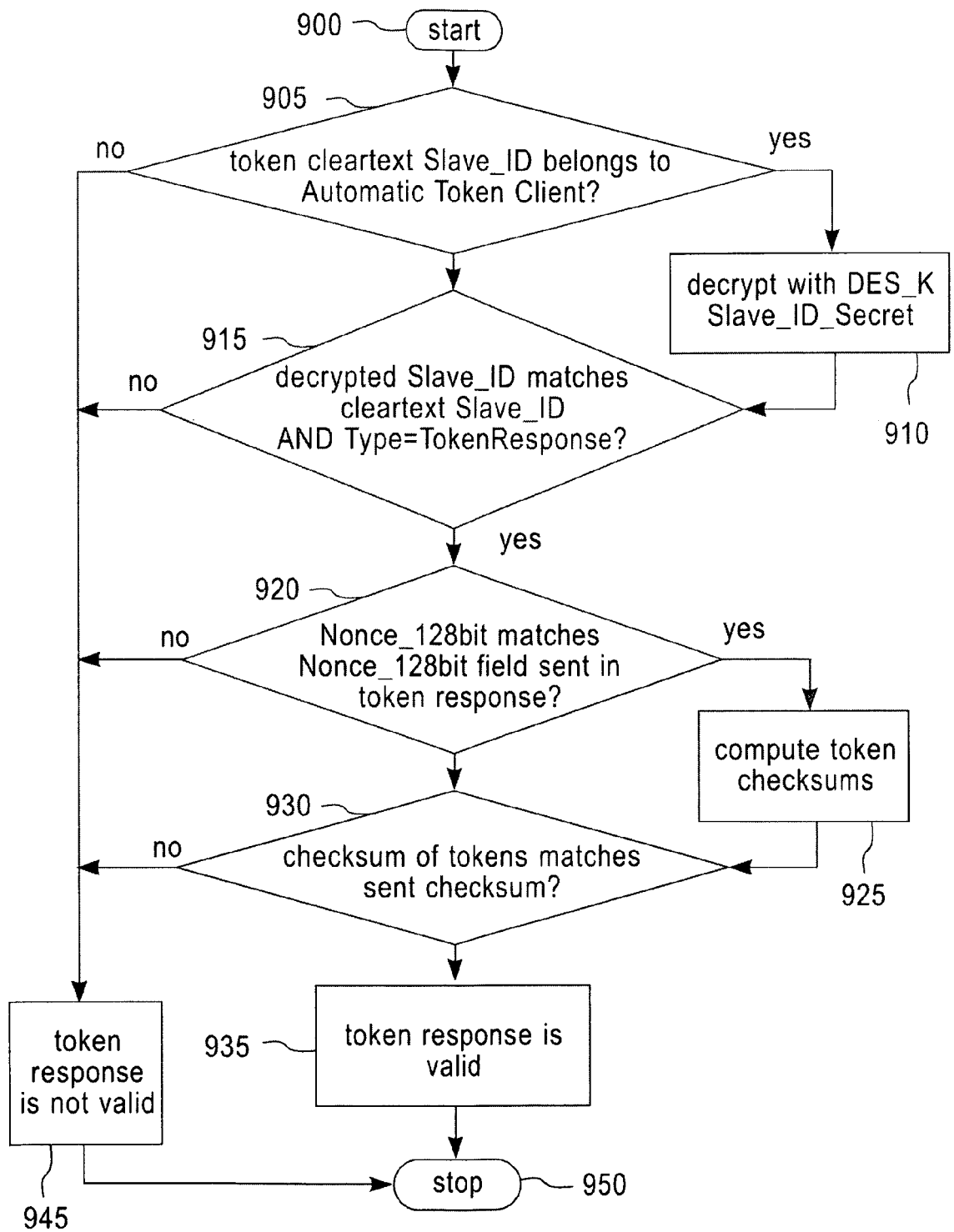
FIG. 9 schematically illustrates the actions taken to validate a Token Response at the Automatic Token Client for the technique shown in FIG. 3.

FIG. 9 shows a flowchart that illustrates the actions taken to validate a Token Response 335 at the Automatic Token Client 320 for the embodiment shown in FIG. 3. The flowchart is entered in step 900 whenever a Token Response 335 arrives at an Automatic Token Client 320. In step 905, the Automatic Token Client checks the Slave_ID field 805 of the Token Response to see if it matches its Slave_ID. If the Slave_ID matches in step 905, then in step 910, the Automatic Token Client decrypts the DES-encrypted 825 portion of the Token Response using the Slave_ID_Secret DES key it obtains when the Pervasive Client registers with the Personal Authentication Gateway (see FIG. 10), and then step 915 is executed. If the Slave_ID does not match in step 905, then in step 945 the Token Response is not valid and execution stops in step 950. In step 915, the Automatic Token Client checks to see if the decrypted Slave_ID field 815 matches the clear text Slave_ID field 805 and whether the Type field 817 denotes a Token Response. If the Slave_ID fields match and the Type denotes a Token Response message in step 915, then step 920 is executed. If the Slave_ID fields do not match in step 915, then step 945 is executed. In step 920, the Automatic Token Client checks to see if the decrypted Nonce__128 bit field 810 matches the Nonce__128 bit field 610 of the corresponding Token Request. If the Nonce__128 bit fields match, then step 925 is executed. If the Nonce__128 bit fields do not match, then step 945 is executed. In step 925, the Automatic Token Server computes checksums for the tokens returned in the Tokens and Checksum field 920 and step 930 is executed. In step 930, the Automatic Token Client checks to see if the checksums computed in step 925 match the checksum in the Token and Checksum field 920. If the checksums match in step 930, then in step 935 the Token Response is valid and step 950 is executed. If the checksums do not match in step 930, then step 945 is executed.

FIG. 10 shows a flowchart that illustrates the actions taken to register a Pervasive Device 115 (slave) for membership within a Pervasive Authentication Domain 100. The flowchart is entered in step 1000 whenever an Automatic Token Client is registered with a Personal Authentication Gateway. In step 1005, the Personal Authentication Gateway determines its Domain_ID. This Domain_ID may be configured, may be uniquely chosen by the Personal Authentication Gateway, or may be based partially on a unique hardware identification. In a preferred embodiment, the Domain_ID is chosen to consist of a concatenation of a unique hardware identification and a non-zero 16 bit integer. In step 1010, a unique Slave_ID is chosen for the Automatic Token Client on the Pervasive device. In a preferred embodiment, this Slave_ID is non-zero and chosen to the concatenation of a unique hardware identification and a 16 bit integer. In step 1020, a Slave_ID_Secret is computed as a combination of the Master key known only to the Personal Authentication Gateway, the Slave_ID, and the Domain_ID of the Pervasive Authentication Domain. In a preferred embodiment, the Slave_ID_Secret is computed as a SHA1 Secure Hash of the Master secret, the Slave_ID, and the Domain_ID as shown in step 1020.

In step 1030, values including the Slave_ID, the Domain_ID, and the Slave_ID_Secret are stored on the Automatic Token Client 320 and then execution halts at step 1035.

In a preferred embodiment, the values Slave_ID, Domain_ID, and Slave_ID_Secret are transmitted to the Automatic Token Client using a shared random password scheme. In the shared random password scheme, the user enters the same random password on the Pervasive Device and the Personal Authentication Gateway. The Personal Authentication Gateway encrypts the values with the shared random password. It also computes a fingerprint of the encrypted values. The encrypted key is transferred to the Pervasive Device where a fingerprint is calculated and the values are decrypted with the shared random password. The fingerprints are compared to help ensure integrity of the transmission. In another embodiment, the values stored on the Automatic Token Client are transferred to it over an SSL link (protected by Client and Server certificate authentication) from the Pervasive Device to the Personal Authentication Gateway. The values may also be transferred using many other mechanisms including Universal Serial Bus memory stick, or hand entry on the Pervasive Device.

In recapitulation, an advantage associated with at least one embodiment of the present invention is that the burden is eased on users by automatically delivering authentication tokens to authorized devices and protects those tokens in case the electronic devices are lost or stolen.

It is to be understood that the present invention, in accordance with at least one presently preferred embodiment, includes a discoverer, a token requester and a token responder, which together may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An apparatus comprising:
   at least one processor;
   a discoverer which finds at least one device configured as a personal authentication gateway capable of responding to token requests for access credentials from at least one pervasive device included in a pervasive authentication domain, the pervasive authentication domain including devices authorized to share access credentials;
   a token requestor which sends at least one token request for at least one token required by the at least one pervasive device;
   a token client which accepts at least one token response including the access credentials from the device configured as a personal authentication gateway;
   wherein the access credentials allow the at least one pervasive device to authenticate to one or more services on behalf of a user as configured in the device configured as a personal authentication gateway; and
   an arrangement adapted to register a pervasive device to be a member of a pervasive authentication domain by registering with the device configured as a personal authentication gateway;
   wherein said registering arrangement comprises:
     an arrangement adapted to enter a same random password on the pervasive device as on the device configured as the personal authentication gateway;
     an arrangement adapted to receive an encryption key and encrypted value generated on the device configured as the personal authentication gateway;
     an arrangement adapted to compute a fingerprint of the value encrypted by the encryption key and the same random password; and
     an arrangement adapted to compare the fingerprint of the value on the pervasive device.

2. The apparatus according to claim 1, wherein the at least one token request comprises a pervasive device identification indicating the at least one pervasive device is a member of the pervasive authentication domain.

3. The apparatus according to claim 2, wherein the at least one token request is encrypted using information obtained during registration as a member of the pervasive authentication domain.

4. The apparatus according to claim 3, wherein said device configured as a personal authentication gateway is a pervasive device.

5. An apparatus comprising:
   at least one processor;
   means for registering at least one pervasive device for membership in a pervasive authentication domain, the pervasive authentication domain including devices authorized to share access credentials; and
   means for receiving a token request for the access credentials from at least one pervasive device;
   means for determining whether the at least one pervasive device is a member of the pervasive authentication domain based on a pervasive device identification;
   means for sending at least one token response including the access credentials to said at least one pervasive device from a device configured as a personal authentication gateway;
   wherein the access credentials allow the at least one pervasive device to authenticate to one or more services on behalf of a user as configured in the device configured as a personal authentication gateway;
   wherein said means for registering comprises:
     means for entering a same random password on the device configured as the personal authentication gateway as on the at least one pervasive device; and
     means for transmitting an encryption key and encrypted value generated on the device configured as the personal authentication gateway to the at least one pervasive device such that the at least one pervasive device can compute a fingerprint of the value encrypted by the encryption key and the same random password and compare the fingerprint of the value.

6. The apparatus according to claim 5, wherein said sending means comprises an arrangement adapted such that the device configured as a personal authentication gateway responds to a pervasive authentication domain discovery message from the at least one pervasive device.

7. The apparatus according to claim 6, wherein:
   said means for sending comprises an arrangement adapted to send the at least one token response only if the pervasive device identification for the pervasive authentication domain discovery message is a member of the pervasive authentication domain of the device configured as a personal authentication gateway.

8. The apparatus according to claim 5, wherein said means for sending comprises:
an arrangement adapted to determine the pervasive device identification of the at least one token request;
an arrangement adapted to derive at least one pervasive authentication domain for the at least one pervasive device; and
an arrangement adapted to retrieve at least one authentication token for the pervasive device.

9. The apparatus according to claim 5, wherein the at least one token response is encrypted.

10. The apparatus according to claim 8, wherein said determining arrangement is adapted to validate that the at least one pervasive device has been registered for the at least one pervasive authentication domain.

11. The apparatus according to claim 8, wherein said determining arrangement is adapted to ascertain whether the at least one pervasive device is within a given distance of the device configured as a personal authentication gateway.

12. The apparatus according to claim 8, wherein said determining arrangement is adapted to ascertain whether the at least one pervasive device has recently made a previous request.

13. The apparatus according to claim 8, wherein said determining arrangement is adapted to ascertain whether the at least one pervasive device has not sent a message indicating that the at least one pervasive device is no longer to be trusted.

14. A non-transitory program storage device readable by machine, tangibly embodying a program of instructions executable by the machine to perform steps comprising:
registering, at a device configured as a personal authentication gateway, at least one pervasive device for membership in a pervasive authentication domain, the pervasive authentication domain including devices authorized to share access credentials;
ascertaining the device configured as a personal authentication gateway from the at least one pervasive device;
sending at least one token request for the access credentials from the at least one pervasive device to the device configured as a personal authentication gateway; and
receiving a token response including the access credentials at the at least one pervasive device from the device configured as a personal authentication gateway;
wherein the access credentials allow the at least one pervasive device to authenticate to one or more services on behalf of a user as configured in the device configured as a personal authentication gateway; and
wherein said registering step comprises:
entering a same random password on the pervasive device as on the device configured as the personal authentication gateway;
receiving an encryption key and encrypted value on the device configured as the personal authentication gateway;
computing a fingerprint of the value encrypted by the encryption key and the same random password; and
comparing the fingerprint of the value on the pervasive device.

15. A non-transitory program storage device readable by machine, tangibly embodying a program of instructions executable by the machine to perform steps comprising:
registering, at a device configured as a personal authentication gateway, at least one pervasive device for membership in a pervasive authentication domain, the pervasive authentication domain including devices authorized to share access credentials;
receiving at least one token request for access credentials from at least one pervasive device at a device configured as a personal authentication gateway for a pervasive authentication domain, the pervasive authentication domain including devices authorized to share access credentials;
determining whether the at least one pervasive device is a member of the pervasive authentication domain; and
sending at least one token response including the access credentials to the at least one pervasive device from the device configured as a personal authentication gateway;
wherein the access credentials allow the at least one pervasive device to authenticate to one or more services on behalf of a user as configured in the device configured as a personal authentication gateway; and
wherein said registering step comprises:
entering a same random password on the device configured as the personal authentication gateway as on the at least one pervasive device; and
transmitting an encryption key and encrypted value generated on the device configured as the personal authentication gateway to the at least one pervasive device such that the at least one pervasive device can compute a fingerprint of the value encrypted by the encryption key and the same random password and compare the fingerprint of the value.

16. An article of manufacture comprising:
a non-transitory computer usable medium having computer readable program code means embodied therein for performing steps for retrieving at least one authentication token from a device configured as a personal authentication gateway, said steps comprising:
registering, at the device configured as a personal authentication gateway, at least one pervasive device for membership in a pervasive authentication domain, the pervasive authentication domain including devices authorized to share access credentials;
ascertaining a device configured as a personal authentication gateway for a pervasive authentication domain from at least one pervasive device, the pervasive authentication domain including devices authorized to share access credentials;
sending at least one token request for access credentials from at least one pervasive device to the device configured as a personal authentication gateway; and
receiving a token response including the access credentials at the at least one pervasive device from the device configured as a personal authentication gateway;
wherein the access credentials allow the at least one pervasive device to authenticate to one or more services on behalf of a user as configured in the device configured as a personal authentication gateway; and
wherein said registering step comprises:
entering a same random password on the pervasive device as on the device configured as the personal authentication gateway;
receiving an encryption key and encrypted value generated on the device configured as the personal authentication gateway;
computing a fingerprint of the value encrypted by the encryption key and the same random password; and
comparing the fingerprint of the value on the pervasive device.

17. An article of manufacture comprising:
a non-transitory computer usable medium having computer readable program code means embodied therein for performing steps comprising:
registering, at a device configured as a personal authentication gateway, at least one pervasive device for membership in a pervasive authentication domain, the pervasive authentication domain including devices authorized to share access credentials;
receiving at least one token request for access credentials from at least one pervasive device at a device configured as a personal authentication gateway for a pervasive authentication domain, the pervasive authentication domain including devices authorized to share access credentials;
determining whether the at least one pervasive device is authorized to receive authentication tokens; and
sending at least one token response including the access credentials to the at least one pervasive device from the device configured as a personal authentication gateway;
wherein the access credentials allow the at least one pervasive device to authenticate to one or more services on behalf of a user as configured in the device configured as the personal authentication gateway; and
wherein said registering step comprises:
entering a same random password on the device configured as the personal authentication gateway as on the at least one pervasive device; and
transmitting an encryption key and encrypted value generated on the device configured as the personal authentication gateway to the at least one pervasive device such that the at least one pervasive device can compute a fingerprint of the value encrypted by the encryption key and the same random password and compare the fingerprint of the value.

18. A computer program product comprising a non-transitory computer usable medium having computer readable program code means embodied therewith for performing steps comprising:
registering, at a device configured as a personal authentication gateway, at least one pervasive device for membership in a pervasive authentication domain, the pervasive authentication domain including devices authorized to share access credentials;
discovering the device configured as a personal authentication gateway for a pervasive authentication domain, the pervasive authentication domain including one or more pervasive devices authorized to receive authentication tokens including access credentials for authenticating to one or more services on behalf of a user;
sending at least one request for at least one token required by the at least one pervasive device for authenticating to one or more services;
accepting at least one token request and sending at least one token response with at least one authentication token to the at least one pervasive device;
wherein said registering step comprises:
entering a same random password on the pervasive device as on the device configured as the personal authentication gateway;
receiving an encryption key and encrypted value generated on the device configured as the personal authentication gateway;
computing a fingerprint of the value encrypted by the encryption key and the same random password; and
comparing the fingerprint of the value on the pervasive device.

* * * * *